United States Patent
Ramisetty et al.

(10) Patent No.: US 11,051,158 B2
(45) Date of Patent: *Jun. 29, 2021

(54) SUBSCRIBER IDENTITY MODULE ACTIVATION FOR NB-IOT DEVICES

(71) Applicant: T-Mobile USA, Inc., Bellevue, WA (US)

(72) Inventors: Phani Ramisetty, Sammamish, WA (US); Kyeong Hun An, Sammamish, WA (US); Karthik Iyer, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,317

(22) Filed: Aug. 24, 2020

(65) Prior Publication Data

US 2020/0389784 A1    Dec. 10, 2020

Related U.S. Application Data

(63) Continuation of application No. 16/685,710, filed on Nov. 15, 2019, now Pat. No. 10,757,564, which is a
(Continued)

(51) Int. Cl.
*H04W 8/18*    (2009.01)
*H04W 8/20*    (2009.01)
*H04W 88/02*   (2009.01)

(52) U.S. Cl.
CPC ........... *H04W 8/183* (2013.01); *H04W 8/186* (2013.01); *H04W 8/205* (2013.01); *H04W 88/02* (2013.01)

(58) Field of Classification Search
CPC ..... H04W 8/183; H04W 8/186; H04W 8/205; H04W 88/02
See application file for complete search history.

(56) References Cited

U.S. PATENT DOCUMENTS

| | | | |
|---|---|---|---|
| 2008/0209206 | A1 | 8/2008 | Vaha-Sipila et al. |
| 2009/0068988 | A1 | 3/2009 | Cofta |

(Continued)

FOREIGN PATENT DOCUMENTS

EP    3432645 A1    1/2019

OTHER PUBLICATIONS

The Extended European Search Report dated Sep. 3, 2020 for European Patent Application No. 20168853.8, 12 pages.
(Continued)

*Primary Examiner* — Nizar N Sivji
(74) *Attorney, Agent, or Firm* — Lee & Hayes, P.C.

(57) ABSTRACT

Processes and systems for locking a NB-IoT device to a NB-IoT SIM before connecting the NB-IoT device to a cellular network are discussed herein. The NB-IoT device may include a status flag that determines whether the NB-IoT device requires a NB-IoT SIM to access NB-IoT-specific functions provided by a cellular network. In one example, a Group Identifier Level 1 (GID1) of the IoT SIM may be queried and compared against a reference value to determine whether the IoT SIM is an NB-IoT SIM, and if confirmed, the NB-IoT device may connect to a cellular network and access the NB-IoT-specific functions. In an example, an NB-IoT device associated with a status flag indicating that the device does not require an NB-IoT SIM may connect to a cellular network, but may not access NB-IoT-specific functions.

20 Claims, 5 Drawing Sheets

Related U.S. Application Data continuation of application No. 16/389,765, filed on Apr. 19, 2019, now Pat. No. 10,484,863.

(56) References Cited

U.S. PATENT DOCUMENTS

| | | |
|---|---|---|
| 2010/0113027 A1 | 5/2010 | Hsu |
| 2010/0138365 A1 | 6/2010 | Hirvela et al. |
| 2016/0049975 A1 | 2/2016 | Uy et al. |
| 2016/0295364 A1 | 10/2016 | Zakaria |
| 2017/0156051 A1* | 6/2017 | Park .................. H04L 67/303 |
| 2017/0238284 A1 | 8/2017 | Tseng et al. |
| 2019/0098487 A1 | 3/2019 | Boettger |

OTHER PUBLICATIONS

GSM Association: "IoT Device Connection Efficiency Guidelines Version 3.0 Mar. 30, 2016", 3GPP Draft; TS.34 V3.1, 3rd Generation Partnership Project (3GPP), Mobile Competence Centre; Sep. 2016, Retrieved from the internet: URL:http://www.3gpp.org/ftp/meetings_3GPP_SYNC/CT/Docs/ , Chapter 5.7 Security Requirments, Chapter 8.2 Radiio Policy Manager Requirements, Aneex B.1 Use of SIM Toolkit Applications and B.3 Barring of Network Connectivity, Figure 1; 85 pages.

\* cited by examiner

SUBSCRIBER IDENTITY MODULE ACTIVATION FOR NB-IOT DEVICES

RELATED MATTERS

This application is a continuation of and claims priority to U.S. patent application Ser. No. 16/685,710, filed on Nov. 15, 2019, titled "SUBSCRIBER IDENTITY MODULE ACTIVATION FOR NB-IOT DEVICES," which is a continuation of and claims priority to U.S. patent application Ser. No. 16/389,765, filed on Apr. 19, 2019, titled "SUBSCRIBER IDENTITY MODULE ACTIVATION FOR NB-IOT DEVICES," the entirety of both which are incorporated herein by reference.

BACKGROUND

The ease of Internet accessibility and communication has facilitated the proliferation of Internet of Things (IoT) devices. An IoT device usually includes one or more sensors and/or controllers for remote control and/or monitoring of systems, devices, and/or the environment, and often includes a network interface for connecting to a wide area network. An IoT device may be controlled by an application installed on any computing device, including user equipment and desktop computers, coupled to the IoT device via a network such as the Internet. An IoT device may use a cellular connection, a WiFi connection, and/or any other network protocols to connect to networks.

IoT devices may use cellular Subscriber Identity Module (SIM) cards for interfacing with a cellular network. A SIM card typically includes an identification number unique to a user and stores personal data such as passwords, phone numbers, and messages. The SIM card includes information necessary for authentication of the IoT device before connecting to a cellular network. Removal of the SIM card from an IoT device prevents the IoT device from accessing a cellular network such as 2G, 3G, 4G, LTE, and 5G networks. Because many IoT devices do not use the full amount of bandwidth provided by contemporary cellular connections, IoT devices may use a narrow band, rather than the full cellular bandwidth, to transmit or receive a limited amount of data. Such IoT devices are called narrow band IoT (NB-IoT) devices and these devices usually transmit or receive data infrequently, utilizing much less than the full bandwidth available with a cellular connection.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Described herein are systems and methods for locking a NB-IoT device for use with a NB-IoT SIM. In an example, the systems and methods determine a status for a NB-IoT device. This status represents how the NB-IoT device uses a NB-IoT SIM for operation. In one example, the status of the NB-IoT device indicates that the NB-IoT device should be locked for use with a NB-IoT SIM before connecting to a cellular network. In another example, the status of the NB-IoT device indicates that the NB-IoT device may use any compatible SIM to connect to a cellular network.

The NB-IoT device includes a setting for comparing one or more parameters in the NB-IoT SIM with one or more reference values to validate that the NB-IoT device includes an NB-IoT SIM and thus can access NB-IoT-specific functions. In an example, the NB-IoT device includes a NB-IoT check setting. This NB-IoT check setting is a setting to enable or disable NB-IoT verification. If the NB-IoT verification setting is set to "enable," a specific parameter setting is required to connect the NB-IoT device to the cellular network. For example, if the NB-IoT check setting is enabled for a NB-IoT device, the Global Identifier Level 1 (GID1) may be compared against a reference NB-IoT SIM value to confirm that the NB-IoT device includes a NB-IoT SIM. In an example, a portion of the GID1 value may be compared against the reference NB-IoT SIM value. In an example, the Group Identifier Level 2 (GID2) value (or a portion thereof) may be compared against the reference NB-IoT SIM value to determine that the NB-IoT device includes a NB-IoT SIM. In this case, a device that is determined to be a NB-IoT device may access NB-IoT specific functions.

An example NB-IoT specific function is the Radio Policy Management. The Radio Policy Management may be used to control network connection functionality. For example, the Radio Policy Management may limit the number of attempts by a user equipment to create a network connection. Limiting the number of network connection attempts prevents a user equipment from having unlimited access to try to connect to the cellular network, thus reducing network congestion.

In an example, if the NB-IoT check setting is set to "disable," the device is considered to be unlocked with respect to the presence of a NB-IoT SIM. In this case, the IoT device may connect to the cellular network with its included SIM, and may not access NB-IoT specific functions.

The disclosed systems and methods permit that an NB-IoT device to access NB-IoT functionality upon the confirmation of the existence of a NB-IoT SIM. Limiting a NB-IoT device to work only with a NB-IoT SIM protects the network from unwanted traffic, enhances the network performance, and reduces network congestion. Each of these benefits may be obtained from using a NB-IoT SIM in a NB-IoT device.

A NB-IoT device may include sensors, controllers, and/or actuators for collecting data or performing actions on devices or the environment. The data associated with the sensors, controllers, and/or actuators of the NB-IoT devices may be transmitted to or from NB-IoT devices via a network. In an example, a NB-IoT device may be coupled to a network through a cellular connection from a cellular base station (e.g., an eNodeB (eNB) in the case of LTE and a gNodeB (gNB) in the case of 5G). A NB-IoT device coupled to a network may be controlled by an application installed on a computing device that is also coupled to the network.

Example computing devices include user equipment such as mobile computers, mobile phones, smart phones, tablets, desktop computers, servers, and the like. The application may also include functionality to analyze and/or display data collected by the NB-IoT device. In an example, a user equipment or a remote computer may host an application that controls the sensors of an NB-IoT device. In an example, a NB-IoT device may be controlled by a user equipment via a IoT server. In an example, an application on the user equipment may control the NB-IoT device. In an example, NB-IoT devices may use less power than IoT devices using the full cellular bandwidth.

A NB-IoT device may include a subscriber identity module (SIM) card to facilitate connection to a cellular network. In an example, an embedded SIM or eSIM card may be used. The NB-IoT device may include an interface for receiving a SIM card. In an example, the NB-IoT device may include an interface for receiving an eSIM card. In this disclosure, a SIM, eSIM, and eUICC may be used interchangeably. In an example, a SIM in the NB-IoT device may include identifiers for locking the NB-IoT device to the use of specific NB-IoT SIM cards. The NB-IoT device may include a parameter setting such as a NB-IoT check setting that enables or disables an NB-IoT device for use with an NB-IoT SIM. In the case that the NB-IoT check setting is set to "enable," one or more additional parameters such as GID1 or GID2 are analyzed. In general, and by way of example, rather than functioning as a lock to prevent unauthorized SIM cards from using the user equipment, the parameter GID1 is used as a parameter to allow the user equipment to operate in a NB-IoT mode, thus accessing NB-IoT functionality, rather than in a conventional IoT mode that does not access NB-IoT functionality. In an example, the identifier may be a Group Identifier Level 2 (GID2). In general, and by way of example, the parameter GID2 allows the user equipment to operate in a NB-IoT mode, thus accessing NB-IoT functionality, rather than in a conventional IoT mode that does not access NB-IoT functionality. In this fashion, GID1 and GID2 may permit the NB-IoT device to operate as an NB-IoT device that accesses NB-IoT functionality, or a NB-IoT device that does not access NB-IoT functionality. In an example, The NB-IoT device may include a status flag rather than a parameter indicating the NB-IoT check status regarding whether the NB-IoT device is to be locked for use with an NB-IoT SIM before coupling to a wireless network.

In an example, the NB-IoT device includes a status flag or parameter indicating whether the NB-IoT device is to be locked for use with a NB-IoT SIM. In an example, the status flag may be represented by a pointer to a value in a computer memory location. In an example, the status flag or parameter indicating whether the NB-IoT device is to be locked for use with a NB-IoT SIM may be stored in a computer system controlled by the mobile carrier associated with the NB-IoT device. In an example, a status flag or parameter may be set indicating that only NB-IoT devices having a specific identifier corresponding to one stored in a SIM may be connected to a cellular network. A SIM storing a specific identifier for use with NB-IoT devices is an example of a NB-SIM. In this example, one or more additional parameters of the NB-IoT device may be accessed and analyzed to determine if the NB-IoT device is locked to the NB-IoT SIM being analyzed. In one example, the one or more additional parameters may be a file or key that is used to lock a user equipment to an NB-IoT mode, rather than used to unlock a user equipment. The one or more additional parameters may include parameters stored in the memory of the SIM card such as an integrated circuit card identifier (ICCID), international mobile subscriber identity (IMSI) number, a personal identification number (PIN), a personal unblocking code (PUC), an Authentication Key (Ki), a Local Area Identity (LAI), an Operator-Specific Emergency Number, Advice-Of-Charge parameters, and other parameters. These parameters may be stored in whole or in part on the SIM (which, when used in conjunction with an NB-IoT device, is an example NB-IoT SIM).

A NB-IoT device with a status flag indicating that the IoT device is to be locked to a NB-IoT SIM before accessing a cellular network is an example of a NB-IoT device having a locked status. A NB-IoT device with a status flag indicating that the IoT device may access a cellular network with a compatible SIM card is an example of a NB-IoT device having an unlocked status.

One example parameter for indicating whether a SIM is a NB-IoT SIM for use in a NB-IoT device is GID1. Another example parameter for indicating whether a SIM is a NB-IoT SIM is GID2. In an example, a combination of GID1 and GID2 parameters may be used to indicate that a SIM is a NB-IoT SIM. In an example, a portion of GID1 and a portion of GID2 may be used to indicate that a SIM is a NB-IoT SIM. In another example, one or more of the parameters for determining whether a SIM is a NB-IoT SIM may be stored in one or more files for use by NB-IoT devices. These files may be proprietary files or may be part of files existing on a SIM card. In an example, the one or more NB-IoT files created for NB-IoT devices may be used to differentiate an NB-IoT SIM from other SIM cards. In another example, the NB-IoT files may be used by NB-IoT devices, as well as other IoT devices.

In an example method for performing a NB-IoT device lock, a status or flag of the NB-IoT device is queried to determine whether a NB-IoT SIM is required to access NB-IoT-specific functionality. The status may indicate that the NB-IoT device is to be locked to a NB-IoT SIM before the NB-IoT device may connect to a cellular network. In an example, a NB-IoT device configured with a locked enable status state confirms the presence of a NB-IoT SIM before connecting to a cellular network. One example of confirming the presence of a NB-IoT SIM is to compare the GID1 value of the SIM coupled to the NB-IoT device with a reference NB-IoT SIM. In this case, a GID1 value (e.g., NB-IoT SIM value) equivalent to a reference NB-IoT SIM value confirms the presence of a NB-IoT SIM in a NB-IoT device. A NB-IoT device whose GID1 value of the NB-IoT SIM matches a reference value may thereafter may connect to a cellular network. In an example, the GID2 value may be accessed and compared to a reference value to identify a NB-IoT SIM in a NB-IoT device. A NB-IoT device that that is locked to a NB-IoT SIM may thereafter access NB-IoT-specific functionality In an example, a NB-IoT device whose NB-IoT device lock status is set to "disable," does not require the presence of a NB-IoT SIM. In this case, the NB-IoT may connect to a cellular network, but cannot access NB-IoT-specific functionality.

In one example, the GID1 value may be stored in the SIM of the NB-IoT device for access by the NB-IoT device. In an example, the GID1 value may be stored in any memory location accessible by the NB-IoT device. Other storage locations for the GID1 value include any server accessible by the carrier associated with the NB-IoT device (or its user) or any third party or remote site. Other parameters (such as GID2) may also be stored in various locations including the NB-IoT SIM, other memory locations accessible by the NB-IoT device, a server accessible by the carrier of the NB-IoT device, or any other third party server.

One example NB-IoT device includes a processor and a computer readable memory such as volatile or non-volatile RAM. The computer readable memory may include computer instructions that when executed by the processor determine whether the NB-IoT SIM device should be locked to an NB-IoT SIM. The computer instructions may also determine the presence of an NB-IoT SIM card. In an example, the computer readable media may include computer instructions that when executed perform the methods as disclosed herein. The NB-IoT device may also include networking functionality for interaction with other devices via the network.

Figure 1:
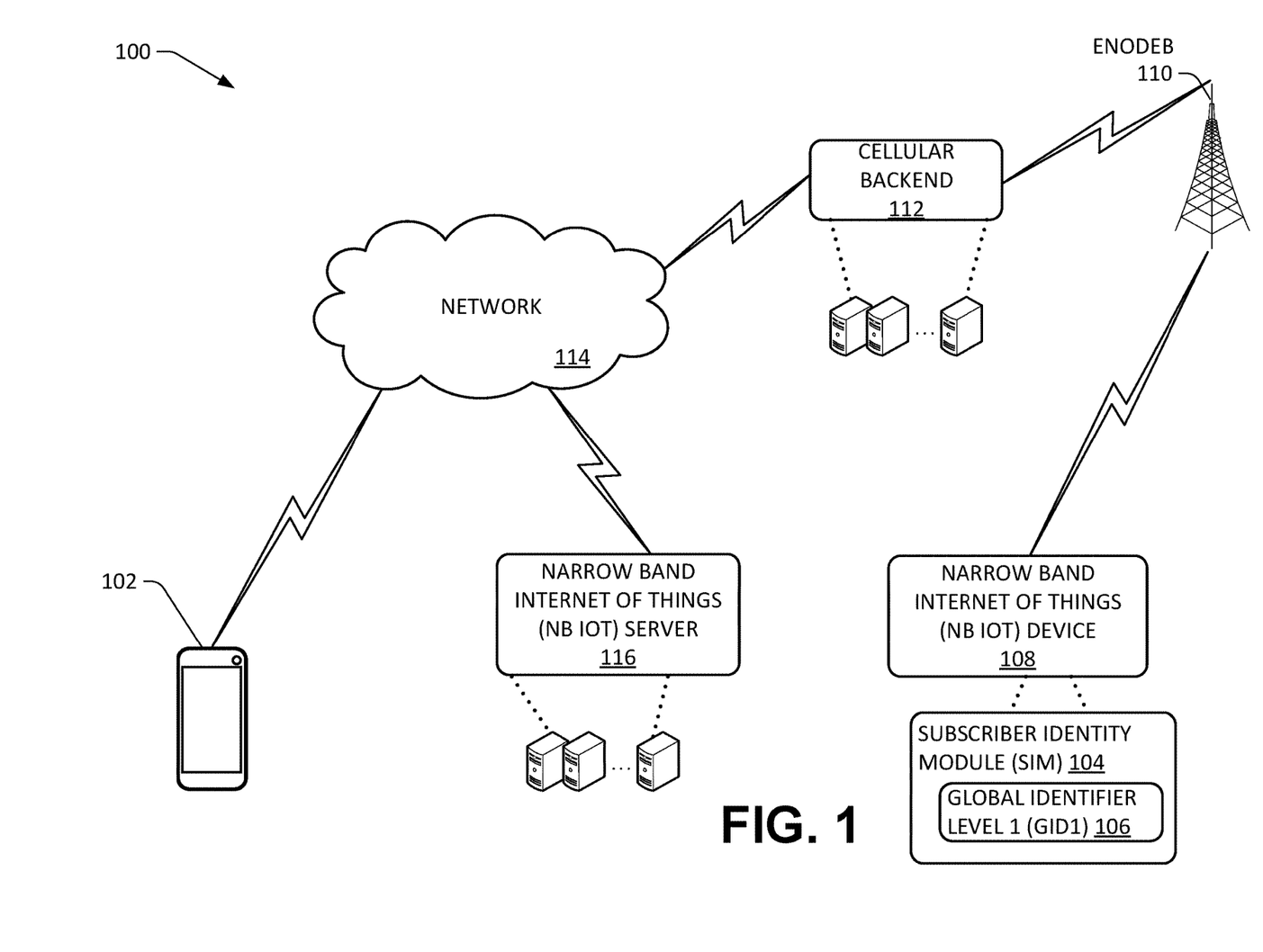
FIG. 1 is an illustrative environment depicting a system for locking a Narrow Band Internet of Things (NB-IoT) device for use with a NB-IoT Subscriber Identity Module (SIM).

FIG. 1 depicts an example environment for locking an NB-IoT device with a NB-IoT SIM. FIG. 1 illustrates a user equipment (UE) 102 that is coupled to a network 114. UE 102 is an example of a UE. FIG. 1 also depicts a NB-IoT device 108 that is coupled to a macrocell eNobeB 110. The eNodeB 110 is coupled to a cellular backend system 112, and the cellular backend system 112 is coupled to the network 114. FIG. 1 also depicts a NB-IoT cloud server 116.

A NB-IoT device may transmit data in several ways. For example, a NB-IoT device 108 may transmit data using a guard band portion of the LTE spectrum that is not used by LTE user equipment. In another example, a NB-IoT device may transmit data using a standalone band deployment that utilizes additional bandwidth. In another example, a NB-IoT device may transmit data using in-band deployment utilizing the same resources of the LTE carrier of the existing LTE network. In other examples, the NB-IoT device may be deployed using other cellular technologies, including 2G, 3G, 4G, and 5G. Regardless of whether the NB-IoT device is deployed in-band, in a guard band, or standalone, the data transfer speed of NB-IoT is typically much lower than that of LTE (or the underlying cellular carrier technology).

The NB-IoT device 108 may include sensors, actuators, and/or controllers. In one example, the sensors in the NB-IoT device 108 may perform various monitoring functions including monitoring of parking, lighting, electrical, or water meters. In some examples, the NB-IoT devices use batteries to provide a limited power supply to the NB-IoT device. The NB-IoT devices may transmit or receive small amounts of data. In some examples, the NB-IoT device may transmit or receive data infrequently such as weekly or monthly interval. In an example, an NB-IoT device may periodically transmit data on a monthly interval.

The NB-IoT device 108 includes a SIM 104. The SIM 104 includes various parameters, including the GID1 106. The SIM information may include user account information, including the cost and usage of the plan associated with the NB-IoT device. The example depicted in FIG. 1 assumes that the status flag for the NB-IoT lock is set for a NB-IoT lock. Upon obtaining the GID1 value in the SIM, the GID1 value may be compared against a reference value stored by the carrier backend system to determine if the NB-IoT device includes the appropriate NB-IoT SIM.

NB-IoT devices typically use a limited amount of data and slower speed than do IoT devices that utilize full LTE functionality. In an example, a NB-IoT device uses a SIM card that is different from that used by LTE-based devices. One example SIM is a NB-IoT SIM allowing the NB-IoT device to connect to a cellular network for transfer of a limited amount of data. The functionality of the NB-IoT device may depend on the type of SIM card used. In an example, a user may have a LTE SIM card for use in user equipment to enable much faster data transfer, with attendant increase in power requirements. A user may also obtain a SIM card for use with a NB-IoT device having low power and a limited amount of data transfer.

The NB-IoT lock setting configures the NB-IoT device as to its operation. For example, a NB-IoT device whose status is set to "disable" may connect to the cellular network using its existing SIM, but may not access the NB-IoT-specific functionality.

A NB-IoT device whose status is set to "enable" requires a NB-IoT SIM before connecting to cellular network and also to ensure that such a device may access the NB-IoT functionality such as lower bandwidth, lower energy use, and radio policy management functions. A NB-IoT device whose status is set to "enable" but is not configured with a NB-IoT SIM cannot access the cellular network. For such a device, the connection process stops. In an example, a NB-IoT device whose status is set to "enable" and is configured with a NB-IoT SIM can access the cellular network, including the NB-IoT-specific functionality. In an example, a NB-IoT device whose status is set to "enable" and is configured with a NB-IoT SIM may be configured to access only the NB-IoT-specific functionality of the cellular network.

In an example, the NB-IoT device includes a status flag for enabling a NB-IoT SIM value check before connecting the NB-IoT device to a cellular network. For example, a device having a status flag that is set indicates that a specific parameter value of the SIM card should be queried to determine if the parameter value of the SIM matches a pre-determined value before connecting the NB-IoT device to the cellular network. Example parameter values to be queried include GID1 and GID2. In an example, the NB-IoT device may include a parameter value enabling a value check from the SIM before connecting the NB-IoT device to a cellular network. In an example, the status flag or parameter value for determining the NB-IoT lock status may be stored in the IoT SIM card.

The NB-IoT device 108 may be coupled to a macrocell eNobeB 110 as shown in FIG. 1. FIG. 1 also depicts a cellular backend system 112 coupled to the macrocell eNobeB. The cellular backend may perform some or all procedures and methods for connecting the NB-IoT device to a cellular network. For example, the cellular backend system 112 may store the status flag or parameter for determining the status of the NB-IoT lock. In an example, the cellular backend system 112 may require the IoT device to register as a NB-IoT device using an NB-IoT SIM. The cellular backend system may only permit IoT devices with a confirmed NB-IoT SIM to register on the network. In this case, a IoT device that does not include a NB-IoT SIM may not be permitted to register on the network.

In one example, the IoT device may register as a NB-IoT device 108 by sending a transmission to the cellular backend system 112 declaring itself as a NB-IoT device.

FIG. 1 also depicts a NB-IoT server 116 for controlling the operation of the NB-IoT device 108. The NB-IoT server 116 may receive sensor or monitoring data from the NB-IoT device. In one example, the NB-IoT device 108 transmits data to the NB-IoT server 116 for analysis. As part of the analysis, the NB-IoT server 116 may generate and transmit data to the NB-IoT device 108 for further sensing monitoring, and/or control. In an example, the NB-IoT server 116 may transmit the data generated during analysis to the UE 102 for display. In an example, the NB-IoT device 108 may register as a NB-IoT device by sending a transmission to the NB-IoT server 116 declaring itself as a NB-IoT device.

The UE 102 may include a user interface for interacting with the NB-IoT server 116 and/or the NB-IoT device 108. The UE 102 may include functionality to send commands to the NB-IoT device 108 to control the NB-IoT device 108. In an example, the UE 102 may send commands to the NB-IoT server 116 to control the NB-IoT device 108.

In an example, the UE 102 may include an application that analyzes the data generated from the NB-IoT device 108 and/or the NB-IoT server 116. The analysis and/or control of the NB-IoT device 108 may be under the exclusive or joint control of the UE 102 and/or the NB-IoT cloud server 116.

Figure 2:
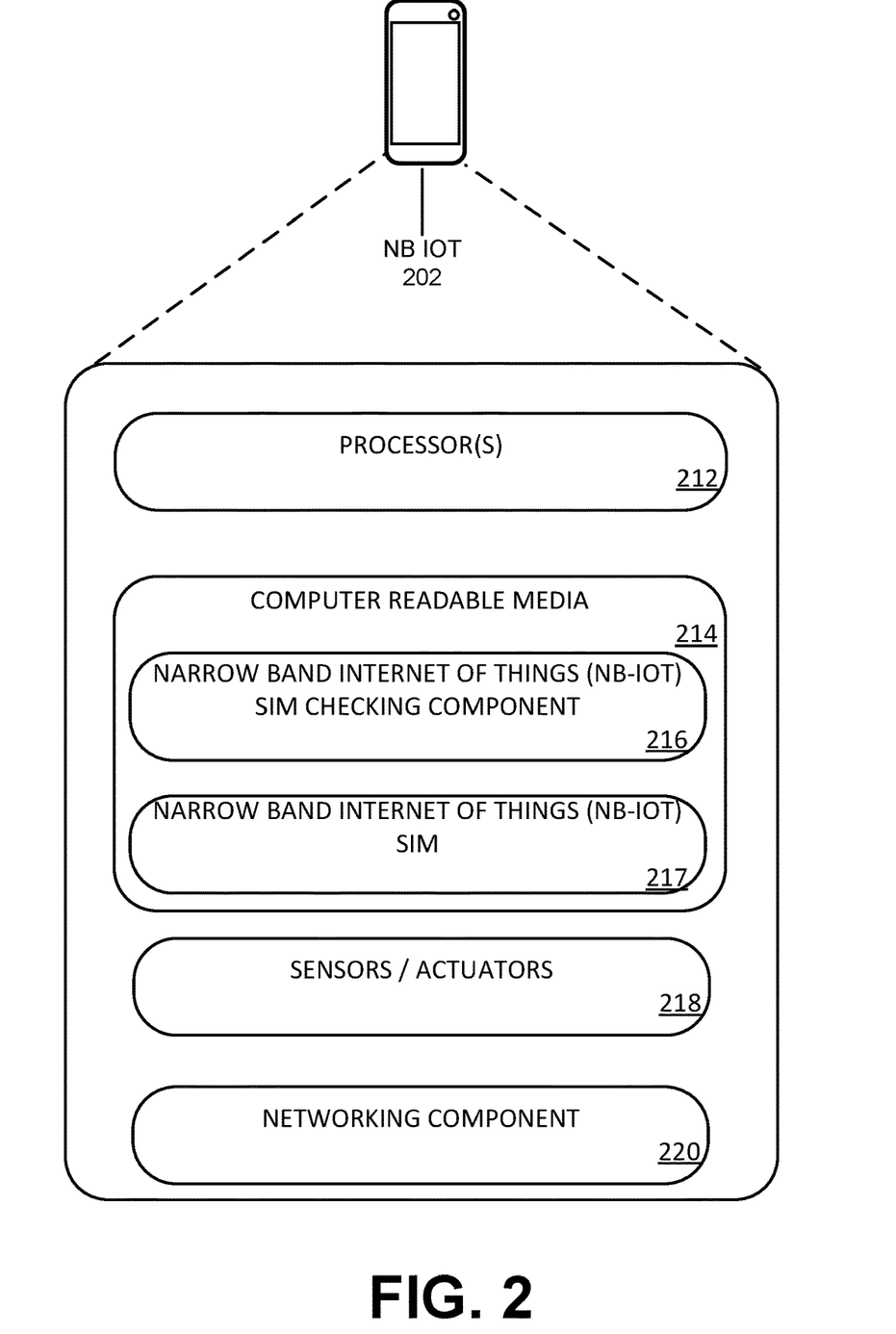
FIG. 2 illustrates an example NB-IoT device that includes a NB-IoT SIM.

FIG. 2 depicts an example NB-IoT device according to an embodiment of the disclosed systems and methods. The NB-IoT device 202 depicted in FIG. 2 includes one or more processors 212 and a computer readable media 214 such as a memory. The computer readable media 214 includes a NB-IoT SIM checking component 216 that when executed perform the value checking for NB-IoT locking functions for the NB-IoT device 202. The computer instructions for the NB-IoT SIM checking component 216 when executed by one or more processors determine whether the NB-IoT device 202 includes an appropriate NB-IoT SIM 217 before connecting to a cellular network. The NB-IoT device 202 includes sensors and actuators 218 and a networking component 220.

Example computer readable media 214 include RAM, ROM, firmware, flash memory, EEPROM, or other types of memory storage known to one of ordinary skill in the art. Tangible computer-readable media may include volatile memory and nonvolatile memory, removable and non-removable media implemented in any method or technology for storage of information, such as computer readable instructions, data structures, program components, or other data. Computer-readable media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 212 of the orchestration server(s). Any such tangible computer-readable media may be included in an NB-IoT device 202.

The computer readable media 214 includes computer instructions for a NB-IoT SIM checking component 216 that determine whether the NB-IoT device 202 requires an NB-IoT SIM. In one example, the computer instructions 216 that when executed by the one or more processors 212 determine whether the NB-IoT device 202 is locked to a NB-IoT SIM, preventing the NB-IoT device 202 from connecting to a cellular network without an appropriate NB-IoT SIM.

The NB-IoT SIM checking component 216 may be implemented in various fashions. In an example, a status flag or value is queried to determine whether the NB-IoT device 202 should be locked to a NB-IoT SIM. The status flag may be implemented as a value in a memory location accessible by the NB-IoT SIM. In an example, the status flag may be stored in the computer readable media 214. In an example, the status flag may be stored in a memory or database maintained by the cellular carrier. In an example, if the computer instructions 216 when executed by the one or more processors 212 determine that the UE need not be locked to a NB-IoT SIM, the NB-IoT device may connect to a cellular network using the SIM in the NB-IoT device. In an example, if the computer instructions 216 when executed by the one or more processors 212 determine that the NB-IoT device should be locked to a NB-IoT SIM, the computer instructions 216 determine the identification of the SIM in the IoT device before connecting to a cellular network.

The identification of a NB-IoT SIM may be implemented in various ways. For example, the Group Identifier Level 1 (GID1) value stored in the SIM may be accessed and compared against a reference GID1 for the NB-IoT device 202. If the GID1 of the SIM matches the reference GID value, the NB-IoT device is determined to have an appropriate NB-IoT SIM and thereafter is connected to a cellular network. The reference GID1 value may be stored in the computer readable media 214. In an example, the reference value may be stored in the memory or database of the cellular backend.

The NB-IoT device 202 may include sensors and/or actuators 218 for interacting with the external environment. For example, the sensors may measure water or electricity usage, or may be part of a parking meter. The sensors and/or actuators may be implemented based on the desired features and functionalities of the NB-IoT SIM. The disclosed systems and methods are not to be limited by the sensors and/or actuators of the NB-IoT device.

The NB-IoT device 202 shown in FIG. 2 includes networking component 220 for providing ports and components for communicating with other networks, including cellular networks and other wireless networks. The networking component 220 includes transceivers for communicating with cellular systems, such as 2G, 3G, 4G, LTE, and 5G. The disclosed systems and methods are not limited to current cellular systems and may apply to future cellular developments. The networking component 220 may also include transceiver ports for local area networks (LANs) and wide area networks (WANs). In one example, the LAN and/or WAN ports provide a wired connection to and Intranet and/or Internet. The networking component 220 may also include a wireless communications component that includes one or more wireless transceivers. For example, the transceivers can include a network interface card (NIC), a network adapter, a LAN adapter, or a physical, virtual, or logical address to connect to various network(s), or to the NB-IoT device 202. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers can also include other wireless modems, such as a modem for engaging in Wi-Fi, WiMax, Bluetooth, or infrared communication.

Figure 3:
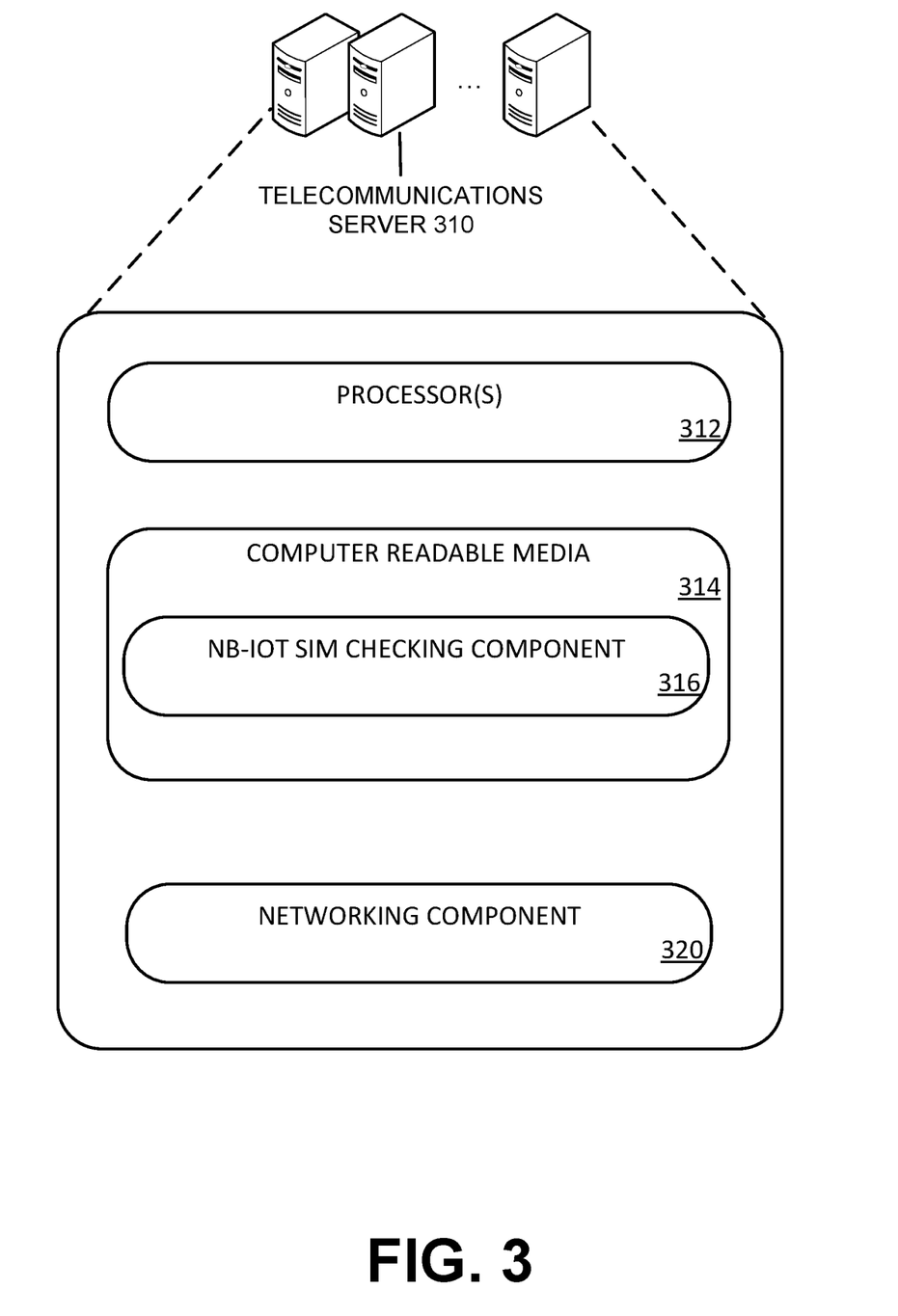
FIG. 3 illustrates an example NB-IoT server computer for use with a NB-IoT device.

FIG. 3 depicts a telecommunications server 310 associated with the cellular backend for the NB-IoT device according to the disclosed systems and methods. In this example, the functionality for determining whether a NB-IoT device includes an appropriate NB-IoT SIM is included in the functionality of the telecommunication server. It is to be understood that the functionality for determining the identity of the NB-IoT SIM may be included in any computing device in the system.

The telecommunications server 310 depicted in FIG. 3 includes one or more processors 312, a computer readable media 314, and a networking component 320. The computer readable media 314 includes computer instructions that when executed by the one or more processors analyze the SIM of the NB-IoT device. It is understood that the telecommunications server 310 is not limited to the components shown in FIG. 3, but may include additional components known in the art.

Example computer readable media 314 include RAM, ROM, firmware, flash memory, EEPROM, or other types of memory storage known to one of ordinary skill in the art. Tangible computer-readable media may include volatile and nonvolatile, removable and non-removable media implemented in any method or technology for storage of information, such as computer readable instructions, data structures, program components, or other data. Computer-readable media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 212 of the orchestration server (s). Any such tangible computer-readable media may be included in the telecommunications server 310.

The computer readable media 314 may include computer instructions 316 that perform the NB-IoT SIM checking component functions relating to determining whether the NB-IoT device requires an NB-IoT SIM. In one example, the computer instructions 316 when executed by the one or more processors 312 determine whether the NB-IoT device is locked to a NB-IoT SIM, preventing the NB-IoT SIM device from connecting to a cellular network without an appropriate NB-IoT SIM.

In an example, the NB-IoT device may communicate with the telecommunications server 310 to indicate to the telecommunications server 310 that the telecommunications server should verify the NB-IoT SIM. In an example, The NB-IoT device includes functionality for enabling the NB-IoT SIM. The NB-IoT SIM analysis may be implemented in various fashions. In an example, a status flag or value of the NB-IoT device is received and analyzed to determine whether the NB-IoT device should be locked to a NB-IoT SIM. The status flag determines whether an NB-IoT SIM is required to access NB-IOT-specific functionality or if the NB-IoT device with its SIM may access the cellular network, but not access the NB-IoT-specific functionality.

In an example, if an NB-IoT with a set status flag requires an NB-IoT SIM, otherwise the NB-IoT device may connect to the cellular network using any compatible SIM. In an example, if the computer instructions 316 when executed by the one or more processors 312 determine that the UE need not be locked to a NB-IoT SIM, the NB-IoT device may connect to a cellular network using any compatible SIM. In an example, if the NB-IoT SIM checking component computer instructions 316 when executed by the one or more processors 312 determine that the NB-IoT device should be locked to a NB-IoT SIM, the computer instructions determine the identification of the SIM in the IoT device.

The identification of a NB-IoT SIM may be implemented in various ways. For example, the Group Identifier Level 1 (GID1) of the SIM may be accessed or received by the telecommunications server and compared against a reference GID1 for the NB-IoT device. In an example, the reference GID1 value is stored in the telecommunications server 310. In an example, the reference GID1 value is stored in the NB-IoT device. If the GID1 of the SIM matches the reference GID1 value, the NB-IoT device is determined to have an appropriate NB-IoT SIM and thereafter is connected to a cellular network.

The telecommunications server 310 shown in FIG. 3 includes networking component 320 for providing ports and components for communicating with other networks, including cellular networks and other wireless networks. The networking component 320 interfaces with a macrocell on the network, and with the Internet (or other WAN network). It is noted that the disclosed systems and methods are not limited to current cellular systems and may apply to future cellular developments. The networking component 320 may also include transceiver ports for local area networks (LANs) and wide area networks (WANs). In one example, the LAN and/or WAN ports provide a wired connection to and Intranet and/or Internet. The networking component 320 may also include a wireless communications component that includes one or more wireless transceivers. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers can also include other wireless modems, such as a modem for engaging in Wi-Fi, WiMax, Bluetooth, or infrared communication.

Figure 4:
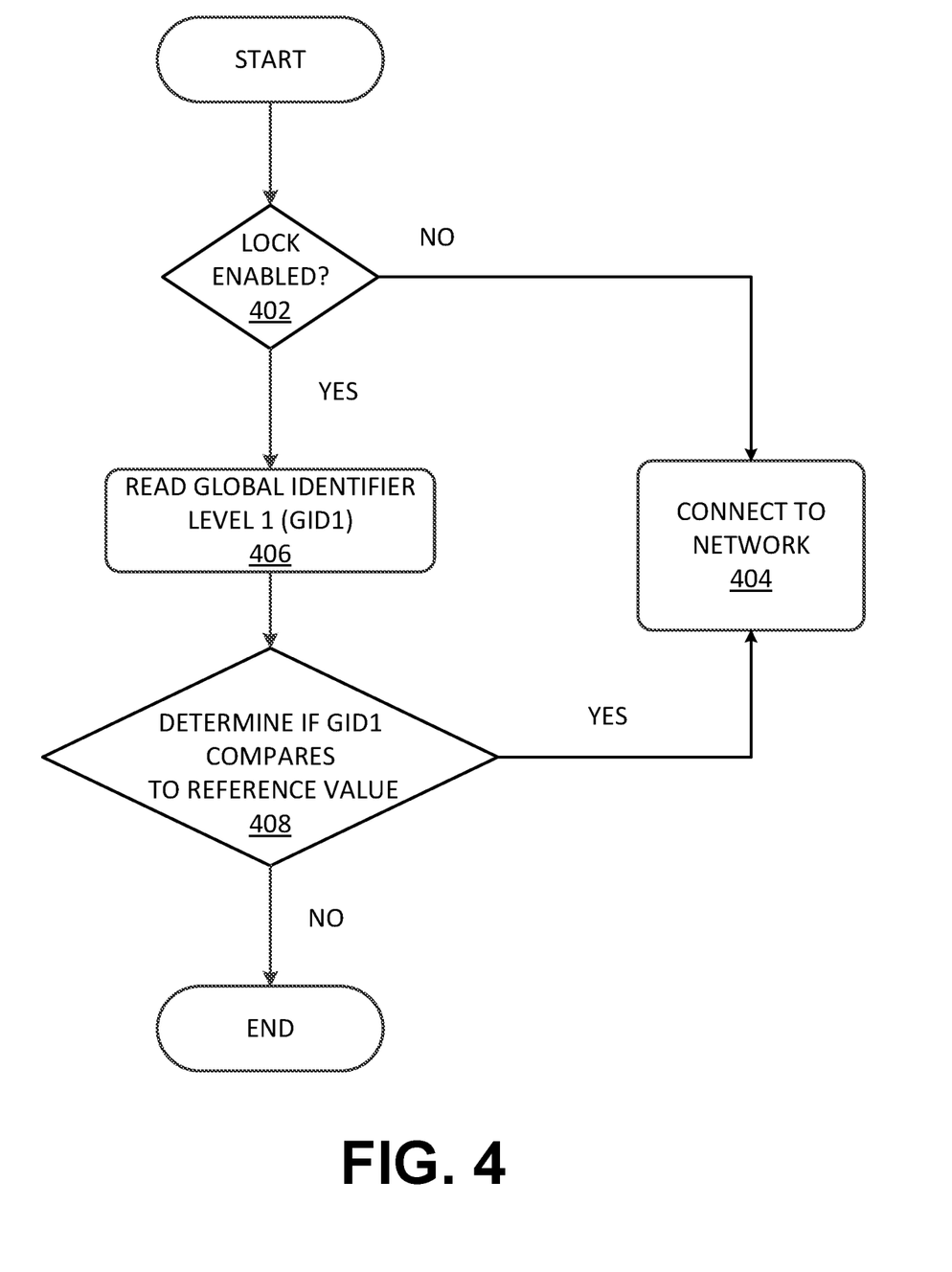
FIG. 4 illustrates an example process for locking n NB-IoT device for use with a NB-IoT SIM.

FIG. 4 depicts an example process for locking an NB-IoT device to a NB-IoT SIM according to an embodiment of the disclosed systems and methods. The process begins by querying a status flag. One example status flag is lock enable status flag depicted at block 402. In another example, the status flag may be represented by a parameter. The lock enable status flag or parameter may be stored in the NB-IoT device. In an example, the lock enable status flag or parameter may be stored in the telecommunications server 310. In an example, the lock enable status flag or parameter may be stored in a third party server. Upon accessing or reading the status flag, the status flag is determined to be set on not set. If the lock enable status flag is not set, control passes to block 404 where the device may connect to a cellular network. If the lock enable status flag is enabled or set, control passes to block 406. At block 406, the NB-IoT parameter is read from the SIM. In the example shown in FIG. 4, the GID1 parameter is queried or read from the SIM. In another example, the GID1 parameter may be queried or read from the telecommunications server or other third party server or computer. In an example, a GID2 value, or combinations of the GID1 and GID2 parameters, may be used in addition to, or in place of the GID1 value as a reference value to determine the identity of the NB-IoT SIM.

After reading the GID1 parameter, control passes to block 408. In this block, the GID1 parameter is compared to a reference GID1 parameter. If the two values match at block 408, control is passed to block 404 to connect the NB-IoT device to a cellular network. If the two values do not match at block 408 the method terminates. A GID2 value, or combinations of the GID1 and GID2 parameters, may be used in addition to, or in place of the GID1 value as a reference value to determine the identity of the NB-IoT SIM.

Figure 5:
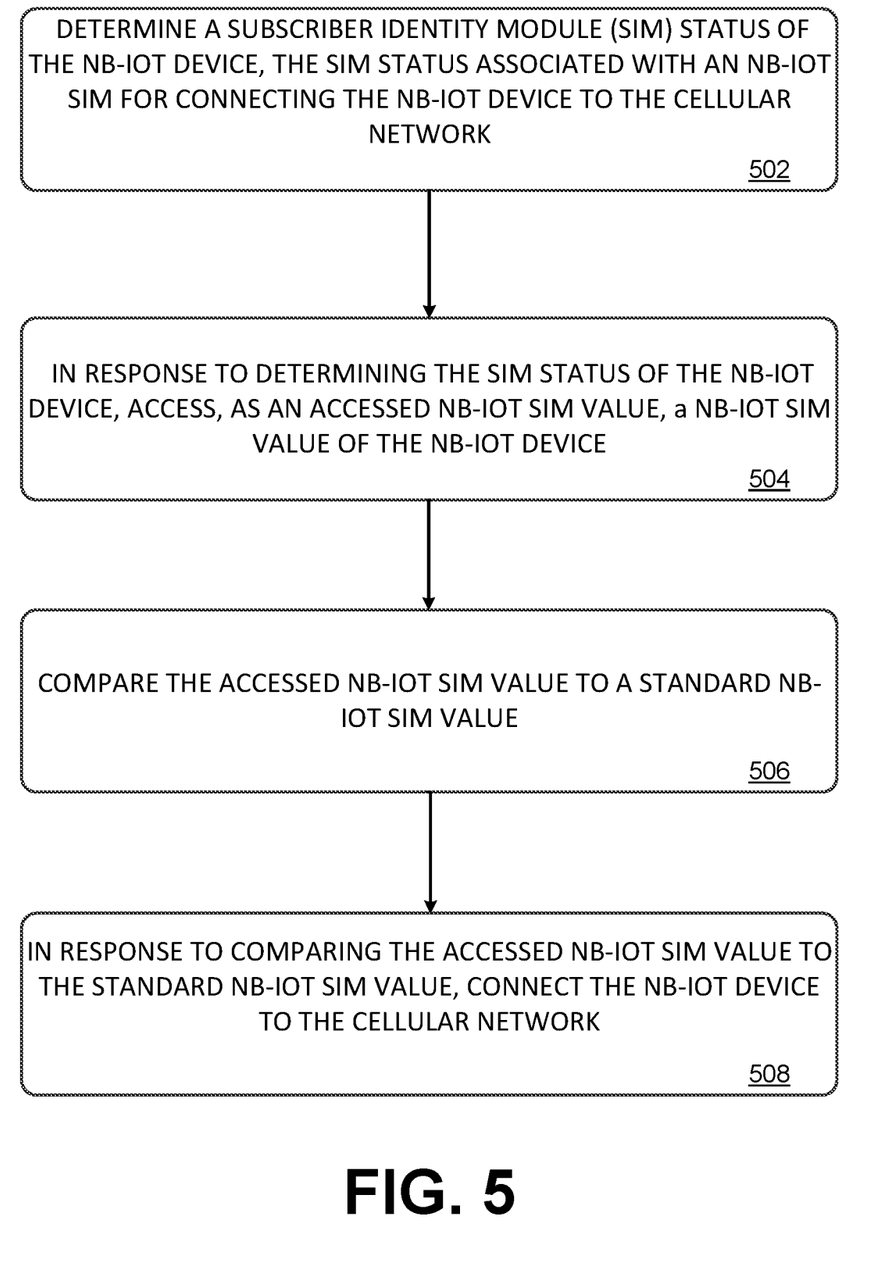
FIG. 5 illustrates another example process for locking a NB-IoT device for use with a NB-IoT SIM.

FIG. 5 illustrates another example process for locking an NB-IoT SIM to an NB-IoT SIM according to an example. The method begins at block 502, in which a SIM status of the NB-IoT device is determined. The SIM status shown in FIG. 5 determines whether the NB-IoT device requires a NB-IoT SIM for connecting to a cellular network. In one example, the SIM status may be determined by a status flag stored in the NB-IoT device. For example, the SIM status flag may be stored in the SIM card of the IoT device. The SIM status flag may also be stored in the memory or database maintained by a telecommunications server. In an example, the status flag may be distributed across the NB-IoT device and the telecommunications server. The status flag of the NB-IoT device queried to determine the SIM status.

At block 504, in response to determining the SIM status of the NB-IoT device, accessing, as an accessed NB-IoT SIM value, a NB-IoT SIM value of the NB-IoT device. In one example, the GID1 value may be accessed. The GID1 value may be stored in the SIM card of the IoT device. The GID1 value may also be stored in the memory or database maintained by the telecommunications server. In an example, the GID2 value may be accessed. In an example, both the GID1 and GID2 values may be accessed.

The accessed NB-IoT SIM value determined at block 504 is compared at block 506 to a reference value to determine the identity of the NB-IoT SIM card. The reference value may be stored on the NB-IoT device. In an example, the reference value may be stored in the memory or database maintained by the telecommunications server.

At block 508, the NB-IoT device may be connected to a cellular network. For example, if comparison shows that the accessed NB-IoT SIM value and the reference NB-IoT SIM value are the same or similar, the NB-IoT device may be connected to a cellular network. Alternatively, if the comparison shows that the accessed NB-IoT SIM value and the reference NB-IoT SIM value are not the same or similar, the NB-IoT device is not connected to the cellular network.

Example

In one example, an NB-IoT device locked to a NB-IoT SIM may access Radio Control Management functions to manage or control the network congestion caused by, for example, IoT device registration and re-registration. One such function of the Radio Control Management is related to the radio policy configuration data stored in a SIM card. The radio policy configuration data may include information that is used to determine connection characteristics such as the number of times the NB-IoT device attempts to connect to the cellular network during registration or re-registration. Absent a registration policy a device may continually attempt to register with the network. By limiting the number of registration attempts, an NB-IoT device with a NB-IoT SIM may avoid or minimize congestion from stemming from malfunctioning NB-IoT devices and/or NB-IoT devices attempting a large number of times to connect to the cellular network.

In an example, a NB-IoT device may be rejected and refused connection by the cellular network. Such a connection rejection may be caused by numerous reasons, including poor reception by the network cell tower, congestion in the cellular network, incorrect SIM value, incorrect device settings, among others. Without using the disclosed systems and methods, IoT devices may attempt to continue to access a cellular network after being rejected by the network. These repeated accesses would create additional network congestion, thereby reducing the overall network health and available system resources. By using a NB-IoT SIM with a NB-IoT device according to the disclosed systems and methods, attempted connections by IoT devices to the cellular network may be controlled. For example, the NB-IoT SIM may include a file to limit the frequency of network connection retries. In an example, the NB-IoT SIM card may set a maximum frequency of the number of network retries, for example, limiting a NB-IoT device to three network retries every hour, thereby reducing network congestion.

The disclosed systems and methods provide radio policy management and settings that facilitate enhanced user experience.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method, performed by a remote computing device, for connecting a narrow band Internet of Things (NB-IoT) device including a subscriber identity module (SIM) to a cellular network, comprising:
   determining a SIM status for connecting the NB-IoT device to the cellular network, wherein the SIM status is a locked status or an unlocked status;
   in response to determining that the SIM status is the unlocked status, connect the NB-IoT device to the cellular network;
   receiving, from the NB-IoT device, an accessed NB-IoT SIM value;
   in response to determining that SIM status of the NB-IoT device is the locked status, accessing the accessed NB-IoT SIM value from the SIM of the NB-IoT device;
   comparing the accessed NB-IoT SIM value to a reference NB-IoT SIM value; and
   in response to comparing the accessed NB-IoT SIM value to the reference NB-IoT SIM value, connecting the NB-IoT device to the cellular network.

2. The method of claim 1, wherein the NB-IoT SIM value is stored in a first memory of the NB-IoT device or a second memory of the remote computing device.

3. The method of claim 1, further comprising:
   receiving, by the NB-IoT device, the reference NB-IoT SIM value, wherein the NB-IoT device compares the accessed NB-IoT SIM value to the reference NB-IoT SIM value.

4. The method of claim 1, further comprising
   accessing the reference NB-IoT SIM value, wherein the remote computing device compares the accessed NB-IoT SIM value to the reference NB-IoT SIM value.

5. The method of claim 1, wherein the SIM status of the NB-IoT device is represented by a flag, by a value, or by a pointer to memory.

6. The method of claim 1, wherein the NB-IoT SIM value is represented by a Group Identifier Level 1 (GID1) value, a Group Identifier Level 2 (GID2) value, or a combination of at least a first portion of the GID1 and at least a second portion of the GID2.

7. The method of claim 1, further comprising:
   determining that the accessed NB-IoT SIM value matches the reference NB-IoT SIM value; and
   connecting the NB-IoT device to the cellular network based at least in part on the accessed NB-IoT SIM value matching the reference NB-IoT SIM value.

8. A narrow band Internet of Things (NB-IoT) device having a subscriber identity module (SIM) configured to connect to a cellular network, the NB-IoT device comprising:
   a processor;
   a subscriber identity module (SIM); and
   a memory storing instructions that, when executed, cause the processor to perform acts comprising:
   determine a SIM status for connecting the NB-IoT device to the cellular network, wherein the SIM status is a locked status or an unlocked status;
in response to determining that the SIM status is the unlocked status, connect the NB-IoT device to the cellular network;
in response to determining the SIM status of the NB-IoT device is the locked status, access, as an accessed NB-IoT SIM value, a NB-IoT SIM value from the SIM of the NB-IoT device;
receiving a reference NB-IoT SIM value from a computer remote from the NB-IoT device;
compare the accessed NB-IoT SIM value to the reference NB-IoT SIM value; and
in response to comparing the accessed NB-IoT SIM value to the reference NB-IoT SIM value, connect the NB-IoT device to the cellular network.

9. The NB-IoT device of claim 8, wherein the NB-IoT SIM value is stored in (1) the memory of the NB-IoT device or (2) the memory of the computer remote from the NB-IoT device.

10. The NB-IoT device of claim 8, wherein determining the SIM status of the NB-IoT device is performed by (1) the NB-IoT device or (2) the computer remote from the NB-IoT device.

11. The NB-IoT device of claim 8, wherein the SIM status of the NB-IoT device is represented by a flag, by a value, or by a pointer to memory.

12. The NB-IoT device of claim 8, wherein the NB-IoT SIM value is represented by a Group Identifier Level 1 (GID1) value, Group Identifier Level 2 (GID2) value, or a combination of GID1 and GID2.

13. The NB-IoT device of claim 8, wherein comparing the accessed NB-IoT SIM value to a reference NB-IoT SIM value includes determining that the accessed NB-IoT SIM value matches the reference NB-IoT SIM value.

14. A non-transitory computer readable media for a use with a narrow band Internet of Things (NB-IoT) device including a subscriber identity module (SIM), the non-transitory computer readable media including instructions that when executed by a computer, cause the NB-IoT device to perform acts comprising:
determine a subscriber identity module (SIM) status for connecting the NB-IoT device to a cellular network, wherein the SIM status is a locked status or an unlocked status;
in response to determining the SIM status is the unlocked status, connect the NB-IoT device to the cellular network;
in response to determining that the SIM status of the NB-IoT device is a locked status, accessing, as an accessed NB-IoT SIM value, a NB-IoT SIM value from the SIM of the NB-IoT device;
receiving a reference NB-IoT SIM value from a computer remote from the NB-IoT device;
compare the accessed NB-IoT SIM value to the reference NB-IoT SIM value; and
in response to comparing the accessed NB-IoT SIM value to the reference NB-IoT SIM value, connect the NB-IoT device to the cellular network.

15. The non-transitory computer readable media of claim 14, wherein the NB-IoT device connected to the cellular network is configured to access NB-IoT-specific functions including a radio policy management function and the radio policy management function limits a number of times the NB-IoT device may attempt to register or re-register with the cellular network.

16. The non-transitory computer readable media of claim 15, wherein the radio policy management function reduces network congestion in the cellular network.

17. The non-transitory computer readable media of claim 14, wherein determining the SIM status of the NB-IoT device is performed by (1) the NB-IoT device or (2) the computer remote from the NB-IoT device.

18. The non-transitory computer readable media of claim 14, wherein the SIM status of the NB-IoT device is represented by a flag, by a value, or by a pointer to memory.

19. The non-transitory computer readable media of claim 14, wherein the NB-IoT SIM value is represented by a Group Identifier Level 1 (GID1) value, Group Identifier Level 2 (GID2) value, or a combination of GID1 and GID2.

20. The non-transitory computer readable media of claim 14, wherein comparing the accessed NB-IoT SIM value to a reference NB-IoT SIM value includes determining that the accessed NB-IoT SIM value matches the reference NB-IoT SIM value.

* * * * *